W. A. WRIGHT.
WHEEL SPOKE AND RIM REPAIRER.
APPLICATION FILED MAY 1, 1916.

1,277,282.

Patented Aug. 27, 1918.

Witnesses
CJMaddox
JWGarner

Inventor
W. A. Wright,
By Victor J. Evans
Attorney

UNITED STATES PATENT OFFICE.

WILLIAM A. WRIGHT, OF CYPRESS INN, TENNESSEE.

WHEEL SPOKE AND RIM REPAIRER.

1,277,282.　　　　Specification of Letters Patent.　　Patented Aug. 27, 1918.

Application filed May 1, 1916. Serial No. 94,721.

*To all whom it may concern:*

Be it known that I, WILLIAM A. WRIGHT, a citizen of the United States, residing at Cypress Inn, in the county of Wayne and State of Tennessee, have invented new and useful Improvements in Wheel Spoke and Rim Repairers, of which the following is a specification.

This invention is an improved device for use on a vehicle wheel to repair the rim and a spoke and to tighten the same, the object of the invention being to provide an improved device of this character which is cheap and simple in construction, which may be readily applied, and by means of which a vehicle wheel may be very rapidly and economically repaired.

The invention consists in the features of construction, combination, and arrangement of devices, hereinafter fully described and claimed.

In the accompanying drawings:—

Figure 1:
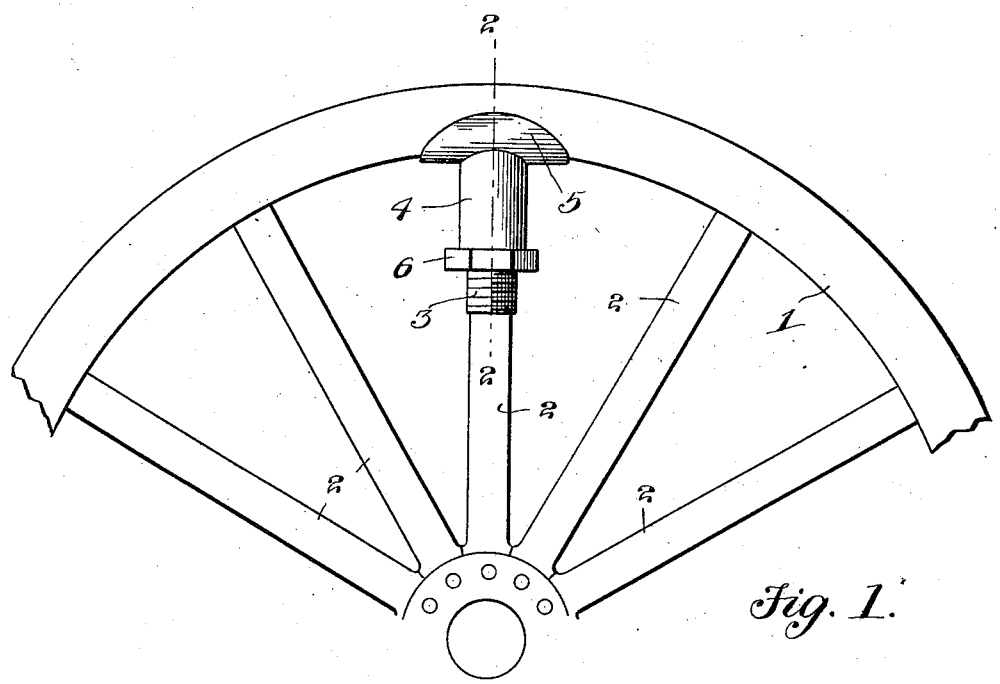
Figure 1 is an elevation of a portion of a wheel provided with a spoke and rim repairer constructed and arranged in accordance with my invention.
Figure 2:
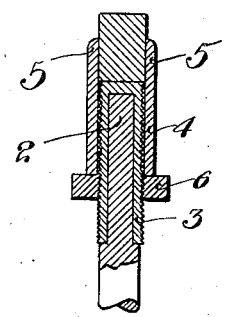
Fig. 2 is a sectional view on the plane indicated by the line 2—2 of Fig. 1.

For the purposes of this specification, the wheel rim is indicated at 1 and the spokes at 2. The spoke and rim repairer comprises a threaded thimble 3 to fit on the outer end of a spoke, a collar 4 slidably fitted for radial movement on the thimble and provided at the outer end with flanges 5 to engage on opposite sides of the rim, and a nut 6 screwed on the thimble and by means of which the collar may be forced outwardly, to bear against the inner side of the rim and thereby tighten and brace the same and also firmly hold the outer end of the spoke.

My improved spoke and rim repairer is extremely simple and inexpensive and enables a wheel to be readily repaired and at very small cost.

Having described the invention, what is claimed is:

In a wheel, in combination with a rim and with a spoke having a reduced outer end and a shoulder around the base of the reduced portion, an externally threaded thimble fitted on the outer end of the spoke, and covering the extreme end of the spoke and bearing at its inner end on the shoulder of the spoke, a collar having an unthreaded bore in which the thimble is arranged so that the collar is freely slidable on the thimble, said collar also having means at its outer end for engaging the rim, and an adjusting nut engaging the threaded thimble and arranged at the inner end of the collar.

WILLIAM A. WRIGHT.

Witnesses:
　WAYNE HALT,
　JOE BERRY.

Copies of this patent may be obtained for five cents each, by addressing the "Commissioner of Patents, Washington, D. C."